United States Patent [19]

Ito et al.

[11] 3,915,820

[45] Oct. 28, 1975

[54] PROCESS OF PURIFYING WASTE WATER BY ELECTROLYSIS

[75] Inventors: Takuji Ito, Tokyo; Hisao Yamazaki, Machida, both of Japan

[73] Assignee: Nippon Risui Kagaku Kenkyusho, Japan

[22] Filed: July 1, 1974

[21] Appl. No.: 484,858

[30] Foreign Application Priority Data

July 6, 1973   Japan................................ 48-76887

[52] U.S. Cl. ................... 204/149; 204/152; 210/24; 210/41
[51] Int. Cl.²........................ C02C 5/12; B01K 3/02
[58] Field of Search ........ 204/149, 152; 210/41, 47, 210/24

[56] References Cited
UNITED STATES PATENTS

| | | |
|---|---|---|
| 937,210 | 10/1909 | Harris................................ 204/149 |
| 1,541,947 | 6/1925 | Hartman et al...................... 204/149 |
| 1,544,052 | 6/1925 | Avery .................................. 204/149 |
| 3,092,566 | 6/1963 | Negus .............................. 204/152 X |
| 3,769,186 | 10/1973 | Ichiki et al.......................... 204/149 |
| 3,806,435 | 4/1974 | Ohta et al. .......................... 204/149 |

*Primary Examiner*—John H. Mack
*Assistant Examiner*—A. C. Prescott
*Attorney, Agent, or Firm*—Burgess, Ryan and Wayne

[57] ABSTRACT

A process of purifying waste water containing dye stuffs by carrying out electrolysis of the waste water in two steps at two different pH ranges of the waste water, the electrolysis being carried out by using an iron anode and a carbon, aluminum or aluminum base alloy cathode.

2 Claims, No Drawings

PROCESS OF PURIFYING WASTE WATER BY ELECTROLYSIS

BACKGROUND OF THE INVENTION:

Water pollution is caused by industrial technology. There are observed various waste water, and many different ways of purifying such wast water have been proposed. Many organic or inorganic chemical agents or various processes of electrolysis to purify the waste water have been proposed and put into practical use. However, waste water containing dye stuffs is difficult to purify.

It is, therefore, an object of the present invention to provide a process of purifying waste water containing dye stuffs.

SUMMARY OF THE INVENTION:

The present invention relates to a process of purifying waste water by electrolysis, and more particularly to a process of purifying waste water containing dye stuffs by carrying out electrolysis in two steps.

The electrolysis of the present invention is characterized in that an iron anode and an aluminum or aluminum base alloy cathode are used at a pH of lower than 7 of the waste water, and an iron anode and a carbon cathode are used at a pH of higher than 7 of the waste water, and the electrolysis of the waste water is carried out in two steps at two different pH ranges of the waste water.

The hydrogen ion concentration (pH) of the waste water to be purified is adjusted to about 4 when it is alkaline. In this waste water, an iron anode and an aluminum or aluminum base alloy cathode are dipped, and then the electrolysis is carried out in a current density of about 0.4A/dm$^2$ by applying a DC voltage to the electrodes. The DC voltage depends on a kind of waste water. However, the DC voltage of about 15V is suitably used. Said aluminum base alloy is one containing at least one metal element selected from the group consisting of copper, iron, zinc and manganese.

As the electrolysis is continued with stirring in the manner as described above, the pH goes up and a precipitate is formed. When the pH reaches about 7, the electrolysis is stopped. The electrolysis to this point is the first step of electrolysis.

The precipitate fromed is removed, for example, by filtration to obtain the precipitate-removed waste water. In this water, an iron anode and a carbon cathode are dipped and the second step of electrolysis is carried out by applying a DC voltage to the electrodes in the same manner as that of the first step of electrolysis. As the electrolysis is continued with stirring, a precipitate is formed and the pH goes up. When the pH reaches about 11, the electrolysis is stopped and the precipitate formed is removed to obtain the purified water.

The purified waste water having the pH of about 11 is neutralized to the pH of 7 by adding an acid. Alternatively, said neutralization is carried out by dipping a carbon anode and an aluminum base alloy cathode in the purified waste water and carrying out the electrolysis in the same manner as that described above.

The theoretical considerations of purifying waste water according to this invention are as follows:

In the first step of the electrolysis at a pH of lower than 7, an iron anode and an aluminumm or aluminum base alloy cathode are used. By carrying out the electrolysis, colloidal iron hydroxide and colloidal aluminum hydroxide are produced. Iron hydroxide is produced by dissolution of the iron anode and aluminum hydroxide is produced as follows: the pH of the waste water adjacent to the cathode reaches about 11 by the electrolysis and aluminum or aluminum base alloy is dissolved by an alkaline solution. The colloidal iron hydroxide and aluminum hydroxide has a positive charge at a pH of lower than 7. The positively charge colloidal hydroxide coheres with a negatively charged particulate in the waste water to form a precipitate or a deposit. Further, the positively charged colloidal hydroxide adsorbs dye stuffs as dissolved in the waste water. In the second step of the electrolysis at a pH of higher than 7, the iron anode is gradually dissolved to produce colloidal iron hydroxide, and the latter has a negative charge at a pH of higher than 7 and coheres with a positively charged particulate in the waste water to form a precipitate. Further, the negatively charged colloidal iron hydroxide adsorbs dye stuffs as dissolved in the waste water.

When an aluminum base alloy cathode is used instead of an aluminum cathode, the dissolution of aluminum is facilitated with the aid of copper, iron, zinc or manganese element as contained in the alloy. At the same time, hydroxides of copper, iron, zinc or manganese are produced, and these hydroxides cohere with a particulate and adsorb dye stuffs in the waste water.

DESCRIPTION OF THE PREFERRED EMBODIMENTS:

The following example is given by way of illustration only and is not intended as limitation of this invention.

EXAMPLE

100$l$ of waste water (sample) was get from dye works. This waste water was a suspension having brown-purple color and has a pH of about 4, a transparency of 0.8cm and a chemical oxygen demand (COD) of about 380. In this waste water was dipped an iron anode and an aluminum cathode, and the electrolysis was carried out at a temperature of about 25°C, with stirring, by taking a current density of 0.4Amp/dm$^2$. After the electrolysis was continued for about 20 minutes, the pH of the waste water reached 6.8 and a brownish precipitate was formed. The first step of the electrolysis was stopped and the precipitate was filtered off. The filtrate showed light purple color and had a transparency of 4cm. In this filtrate was dipped an iron anode and a carbon cathode, and the second electrolysis was carried at a temperature of 25°C, with stirring, by taking a current density of 0.4Amp/dm$^2$. After the electrolysis was continued for about 25 minutes, the pH of the waste water reached 10.5 and a light purplish precipitate was formed. The electrolysis was stopped and the precipitate was filtered off. The filtrate was nearly colorless, and had a transparency of more than 30cm and a COD of about 80.

Waste water containing dye stuffs is usually difficult to purify by a conventional purifying process. Such waste water can be purified by carrying out the electrolysis in two steps according to the present invention.

The waste water having a COD of about 80, which has been treated by the process of the present invention, may be treated by active carbon to lower its COD to about 10. Such purified waste water may be reused as industrial water.

In the above Example, a process carrying out electrolysis in two steps has been illustrated, in which the first electrolysis is carried out at a pH of lower than 7 by using an iron anode and an aluminum or aluminum base alloy cathode and the second electrolysis is carried out at a pH of higher than 7 by using an iron anode and a carbon cathode.

Alternatively, the electrolysis may be carried out as follows:

A pH of waste water to be purified is adjusted to about 7 and the first electrolysis is carried out by using an iron anode and a carbon cathode. When a pH reaches about 11, the electrolysis is stopped, and the precipitate formed is filtered off. A pH of the filtrate is lowered to about 4 by carrying out an electrolysis with a carbon anode and an aluminum cathode or by adding an acid to the filtrate, and then the second electrolysis is carried out by using an iron anode and an aluminum or aluminum base alloy cathode. When a pH reaches about 7, the second electrolysis is stopped, and the precipitate formed is filtered off. In this procedure, the first and second steps of the electrolysis are contrary to those as shown in the example. By such procedure, waste water containing dye stuffs can be purified.

We have found that waste water containing heavy metal ions such as copper, iron, manganese, chromium, zinc cadminum and mercury ions can be purified by the process of the present invention. When an aluminum cathode is used, aluminum is facilitated to dissolve by eduction or deposition of the heavy metals and hydroxides of the heavy metals are produced. These hydroxides cohere with a particulate in the waste water and adsorb dye stuffs contained in the waste water.

Furthermore, anions such as phosphate ion and sulfate ion contained in a small amount in the waste water can be removed by the process of the present invention, because colloidal aluminum hydroxide and iron hydroxide adsorb such anions at a pH of lower than 7.

We claim:

1. A process of purifying waste water by electrolysis in two steps, wherein the first step comprises carrying out said electrolysis of the waste water at a pH of lower than 7 by dipping an iron anode and an aluminum or aluminum base alloy cathode in the waste water to be purified and applying a DC voltage to the electrodes, and wherein the second step comprises carrying out the electrolysis of the waste water at a pH higher than 7 by dipping an iron anode and a carbon cathode in the waste water and applying a DC voltage to the electrodes.

2. A process according to claim 1 wherein said aluminum base alloy is one containing at least one metal element selected from the group consisting of copper, iron, zinc and manganese.

* * * * *